United States Patent Office 3,438,357
Patented Apr. 15, 1969

3,438,357
APPARATUS AND METHOD FOR COOLING A
RECIRCULATING COOLANT MEDIUM
Max H. Weber, Wiesendangen, Zurich, Switzerland, assignor to Sulzer Brothers Limited, Winterthur, Switzerland, a corporation of Switzerland
Filed Feb. 14, 1966, Ser. No. 527,299
Claims priority, application Switzerland, Feb. 16, 1965, 2,091/65
Int. Cl. F22b 1/02
U.S. Cl. 122—32           12 Claims

ABSTRACT OF THE DISCLOSURE

The flow of coolant for the reactor enters and leaves the heat exchanger at the same end. After entering the heat exchanger, the coolant flows over the nests of tubes of the heat absorbing means while flowing in a first path. Thereafter, the coolant flows in two concentric paths opposite to the first path over the walls of the heat exchanger to cool the walls and to return to the nuclear reactor.

---

This invention relates to an apparatus and method for cooling a recirculating coolant medium. More particularly, this invention relates to an apparatus and method for cooling a recirculating coolant medium in a heat exchanger having a coolant inlet located at the same end of the heat exchanger as the coolant outlet.

It is an object of this invention to provide an apparatus and method for directing the flow of coolant medium in a heat exchanger into successive opposed paths.

It is another object of this invention to provide a heat exchanger for cooling a recirculating coolant medium having a coolant inlet located at the same end as a coolant outlet.

It is another object of this invention to provide a heat exchanger for cooling a recirculating coolant medium which is compact in size.

Generally, the invention is directed for use with a nuclear reactor in order to cool the recirculating gas coolant medium used therein to cool the reactor core. The apparatus of the invention comprises a heat exchanger of oblong shape having a coolant inlet and a coolant outlet located at one end thereof. The heat exchanger encases a first passage which cooperates with the coolant inlet to direct the flow of heated reactor coolant from the reactor into a first path, a heat absorbing medium conveying means in the first passage for cooling the flow of heated reactor coolant directed thereover in the first path, a pair of spaced concentric second passages concentric to the first passage in cooperation with the first passage and the coolant outlet for directing a flow of cooled coolant into a pair of second paths of flow in opposition to the first path of flow for return to the reactor, and means for directing the flow of coolant from the first passage into the second passages.

The method of the invention includes the steps of directing the flow of a heated coolant from a reactor into a first path of flow, cooling the flow of the heated coolant in the first path of flow, and directing the flow of cooled coolant into a pair of concentric second paths of flow spaced concentrically with respect to the first path of flow for flow in opposition to the first path of flow for return to the reactor. These and other objects and advantages of the invention will become more apparent from the following detailed description and appended claims taken in conjunction with the accompanying drawings in which:

Figure 1:
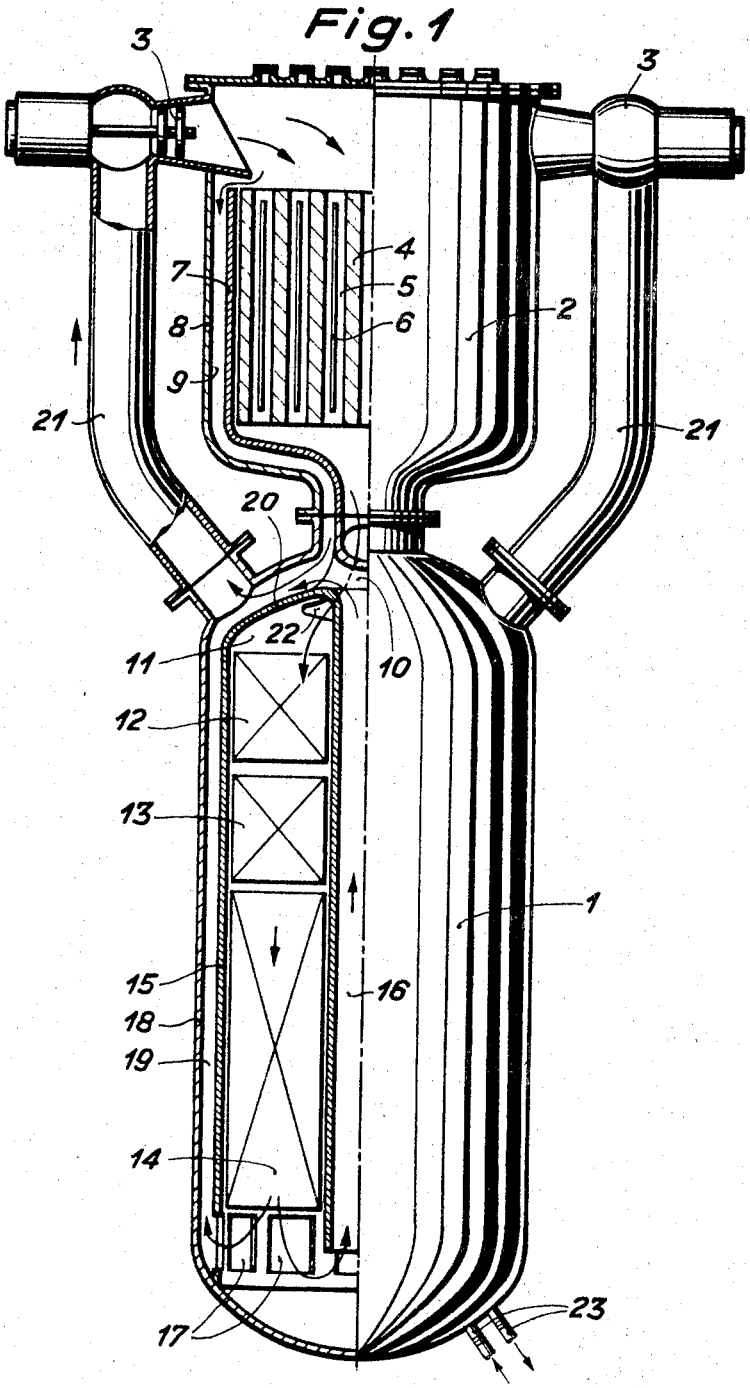
FIG. 1 illustrates a heat exchanger according to the invention in cooperation with a nuclear reactor with parts broken away in cross-section.

Referring to FIG. 1, a reactor 2 which encases a moderator 4 having a plurality of channels 5 and a suitable rod 6 in each channel has a suitable shell 7 surrounding the moderator 4 and a casing 8 spaced from the shell 7 to define an annular space 9. Both the shell 7 and casing 8 are formed with neck-like portions at the respective lower ends thereof.

A heat exchanger 1 which includes a casing 18 having an upper neck-like portion is suitably connected to the casing 8 of the reactor 2. The casing 18 supports a generally cylindrical shell 15 therein in spaced relation thereto so as to define an annular passage 19 therebetween, as well as a cylinder 24 concentrically connected to the shell 15 to define an internal passage 16. The shell 15 is connected to the shell 7 of the reactor by a bell-shaped distribution element 10 having suitable channels therein. In addition, the shell 15 has a plurality of lateral apertures 17 at its base and a calotte 20 at its upper end which contains a pair of apertures 22 for cooperation with the channels of the distribution element 10 and an aperture for connecting the passage 16 with the passage 19 outside of the calotte 20. The passage 11 defined by the shell 15 and cylinder 24 contains nests of boiler tubes which form a heat exchanging medium conveying means comprising a superheater 12, an intermediate superheater 13, and an evaporator and preheater 14. The boiler tubes connect to pipes 23 which project through the bottom of the casing 18.

Further, a plurality of pipes 21 are interconnected to the heat exchanger 1 in communication with the concentrically spaced passages 16, 19 and the reactor 2. The pipes 21 are each provided with a circulation blower 3 adjacent the reactor in order to recirculate a gaseous coolant medium through the reactor 2.

In operation, a gas-like coolant is forced into the reactor 2 by the circulation blower 3 and is directed through the channels 5 and the space 9 to cool the core 4 as well as the casing 8. The coolant which is heated in passing through the channels 5 is then directed through the distribution element 10 and apertures 22 (as indicated by the arrow in FIG. 1) into the passage 11 where it flows in a path over the superheater 12, intermediate superheater 13 and pre-heater 14 so as to be cooled by the heat-absorbing medium flowing in the heat exchanging medium conveying means 12, 13, 14. Thereafter, the cooled coolant is directed partially into the passage 19 through the apertures 17 to cool the casing 18 and mainly into the passage 16, where it flows in paths in opposition to the path of flow of heated coolant in passage 11. The coolant is then directed from each passage 16, 19 into the pipes 21 for recirculation back into the reactor 2 by the blowers 3.

It is noted that the pipes 23 represent the inlet and outlet of the heat absorbing medium conveying means 12, 13, 14 and are connected to a suitable heat consumer, for example, a steam power plant or heating installation.

Figure 2:
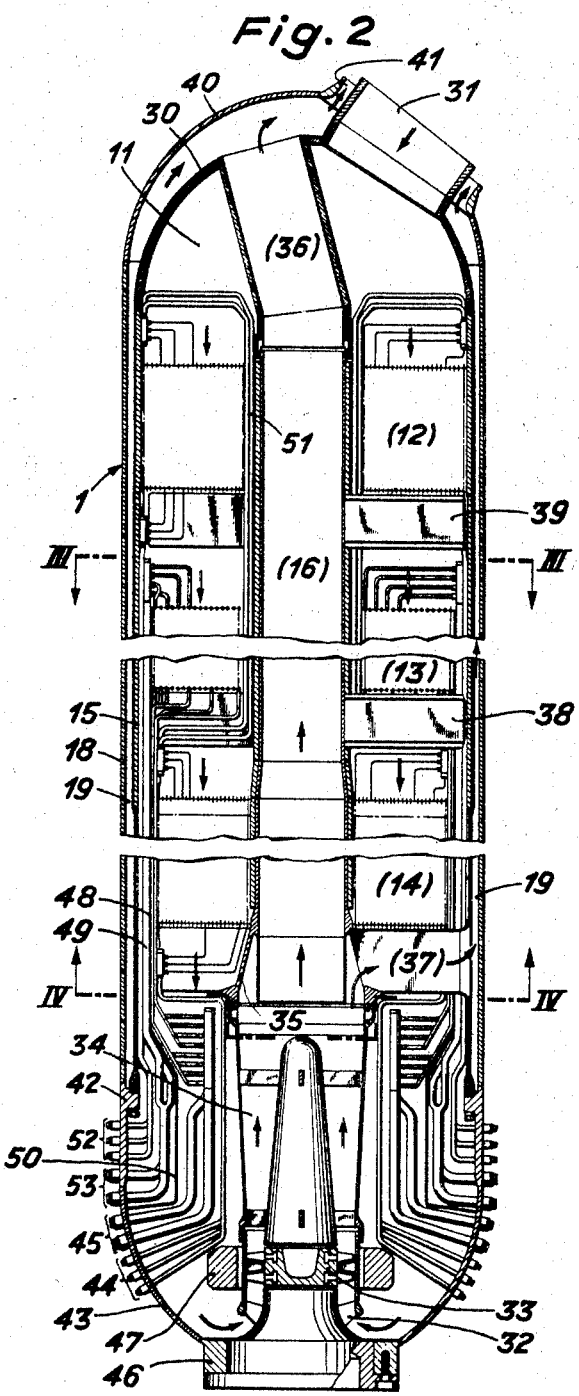
FIG. 2 illustrates a view taken on line II—II of FIG. 3 of a modified heat exchanger of the invention.

Referring to FIG. 2, wherein a modified heat exchanger similar to the heat exchanger of FIG. 1 is shown, like reference characters indicating like parts, the shell 15 is provided with a calotte 30 on its upper end which contains a connection element 31 communicating with the passage 11 and a channel 36 interconnecting passages 16 and 19. Also, the casing 18 is provided with a calotte 40 on its upper end which contains a connection element 41.

The lowermost portion of the heat exchanger 1 is formed exteriorly by an intermediate ring 42 and a spherically-shaped calotte 43 which rests on a support ring 46. In addition, a circulation blower 33 having an annular inlet aperture 32 is positioned below an annular diffuser 34 having a blade receiving ring 47 within the calotte 43. The diffuser 34 is connected by a connection means 35 to the passage 16 as well as to a plurality of hollowed radial arms 37 which serve with radial arms 38, 39 to connect the shell 15 to the wall 24 of passage 16.

In this embodiment, a plurality of sets of pipes 44, 45, 52, 53 are passed through the lower portion heat exchanger 1, for purposes as hereinafter explained, and a jacket 48 is positioned in concentric relation within the shell 15 to surround the nests of tubes 13, 14 and through a portion 50 to connect with the calotte 43 between pipe sets 45 and 53 so as to form an annular chamber 49 with the shell 15.

In operation with a reactor, as above, a heated gaseous coolant is directed through the connection element 31 into the passage 11 wherein it flows over the nests of helically wound tubes 12, 13, 14 to be cooled. Upon reaching the inlet aperture 32, the cooled coolant is directed into the distribution means 35. Thereafter, a part of the cooled coolant is directed in a flow path through passage 16 and channel 36 and the remainder is directed in a flow path through the hollowed radial arms 37 into the passage 19. Upon reaching the space between calottes 30 and 40, the cooled coolant is returned to the reactor through the connection element 41.

Figure 5:
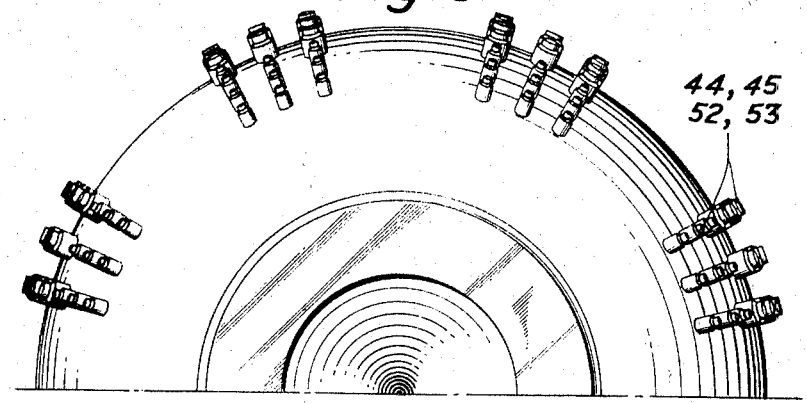
FIG. 5 illustrates a bottom view of the modified heat exchanger of FIG. 2.

The tubes 44, 45, 52, 53 (FIG. 5) serve to conduct the flow of the heat absorbing medium into and out of the heat exchanger and are connected by suitable conduits (not shown) to a steam power plant (not shown). Initially, the heat-absorbing medium is conveyed through tubes 44 to the nest of boiler tubes forming the preheater and evaporator 14. The evaporated medium is then conveyed by tubes 51 to the nest of tubes forming the superheater 12 wherein the medium is superheated. Thereafter, the superheated medium is conveyed through tubes 52 out of the heat exchanger to the heat consumer of a suitable power plant. In this regard, it is noted that tubes 52 are positioned in the chamber 49.

After a partial expansion in the power plant, the medium is conveyed through tubes 45 to the nest of tubes forming the intermediate superheater 13. After subsequent heat absorption, the medium is conveyed through tubes 53 out of the heat exchanger 1 to a second heat consumer (not shown). As above, the tubes 53 are positioned in the chamber 49.

Figure 3:
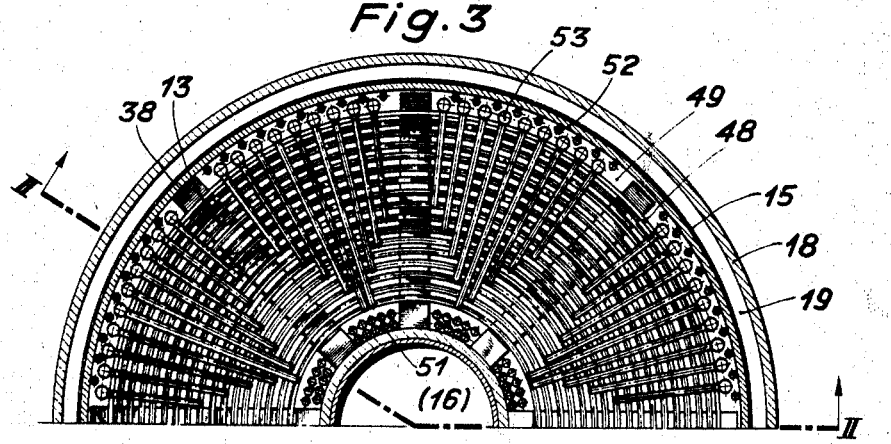
FIG. 3 illustrates a view taken on line III—III of FIG. 2.
Figure 4:
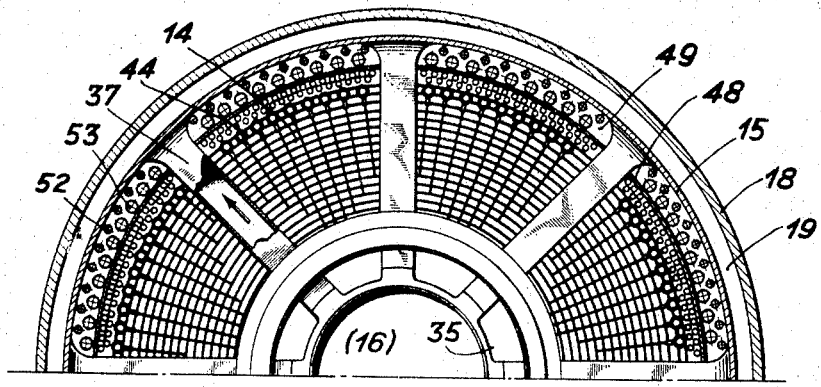
FIG. 4 illustrates a view taken on line IV—IV of FIG. 2.

Because of the separation of the tubes 44, 45 from the tubes 52, 53 by the portion 50 of the jacket 48, there is a minimum, if any, transfer of heat from the hotter tubes 52, 53 to the cooler tubes 44, 45. Referring to FIGS. 3 and 4, the plurality of longitudinally spaced sets of radial arms 37, 38, 39 also serve to support the nests of helically wound tubes of the heat exchanger components 12, 13, 14.

The heat exchanger of FIG. 2 as described is capable of being readily constructed due to its compact nature and of being formed with small casing and shell thicknesses. In addition, the individual components are easily accessible when in place.

An example of a preferred assembling procedure includes the steps of mounting the supporting arms 37, 38, 39 in cantilevered fashion from the wall of passage 16; mounting the nests of tubes for the heat exchanger components 12, 13, 14 on the respective supporting arms 37, 38, 39; making the interior connections between these tubes; attaching jacket 48 in place; sliding shell 15, in whole or in part, over the nests of tubes; and connecting the shell 15 to the supporting arms 37, 38, 39 as well as to the calotte 30 so that all the parts are carried on the walls of passage 16.

Thereafter, the shell 15 is mounted on the intermediate ring 42 which is connected to calotte 43 so that the shell 15 supports the nest of tubes for the components 12, 13, 14 and the walls of the passage 16.

Then, the casing 18 is slid over the shell 15 and connected to the intermediate ring 42 and calotte 40. Finally, the tubes 44, 45, the connection portion 50 of the jacket 48, the blower 33, and blade receiving ring 47 are mounted in the base of the heat exchanger.

It is noted that the radial arms 38, 39 may be hollowed so as to be cooled by the coolant flowing through either passage 16, 19. Also, the hollowed radial arms 38, 39 may open into both the passages 16, 19 to convey coolant from one passage to the other.

It is finally noted that the heat absorbing medium may be water or any other suitable liquid; however, by generating steam, other purposes than the above can be pursued.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. A method of cooling a recirculating coolant medium of a reactor comprising the steps of:
    directing a flow of heated coolant from the reactor into a first axial path of flow,
    cooling the flow of heated coolant in said first path of flow by directing the flow over spaced axially stacked nests of tubes of a heat absorbing medium conveying means in said first path of flow, and
    directing said flow of cooled coolant into a pair of concentric second axial paths of flow in opposition to said first path of flow for return to the reactor, said second paths being concentrically spaced with respect to said first path.

2. An apparatus for cooling a recirculating coolant medium of a reactor comprising:
    a heat exchanger disposed on an elongated axis and having a coolant inlet and a coolant outlet at one end thereof,
    means defining a first axial passage in said heat exchanger cooperating with said coolant inlet for directing a flow of heated coolant from the reactor into a first axial path of flow,
    a heat absorbing medium conveying means in said first passage for cooling the flow of heated coolant in said first path of flow, said conveying means having spaced axially stacked nests of tubes in said first path successively contacted by said heated coolant,
    means defining a pair of spaced concentric second passages concentric to said first passage for directing a flow of cooled coolant into a pair of second paths of flow in opposition to said first path of flow, said second passages cooperating with said first passage and said coolant outlet whereby cooled coolant is returned to the reactor.

3. An apparatus as set forth in claim 2 wherein said nests of tubes form a preheater and evaporator means, an intermediate superheater spaced above said preheater and evaporator means, and a superheater spaced above said intermediate superheater.

4. An apparatus as set forth in claim 2 which further includes a plurality of longitudinally spaced sets of radial arms supporting a respective one of said nest of tubes.

5. An apparatus as set forth in claim 4 wherein as least one of said sets of radial arms includes hollowed arms whereby cooled coolant is directed into said one of said passages.

6. An apparatus as set forth in claim 3 wherein the inlet and outlet portions of said nests of tubes project outwardly of said casing at the same end thereof.

7. An apparatus as set forth in claim 6 which further includes a jacket having a portion disposed between said inlet portions of said nests of tubes and said outlet portions of said nests of tubes whereby the transfer of heat from said outlet portions to said inlet portions is maintained at a minimum.

8. An apparatus for cooling a recirculating coolant medium of a reactor comprising:
  a heat exchanger having a coolant inlet and a coolant outlet at one end thereof, said heat exchanger including an oblong shaped casing, a shell concentrically spaced from said casing to define a first axial annular passage therebetween and a cylinder concentrically spaced from and connected to said shell to define a second axial annular passage therebetween and a third passage therein, said second passage cooperating with said coolant inlet for directing a flow of heated coolant from the reactor into a first axial annular path of flow and said first and third passages cooperating with said second passage and said coolant outlet for directing a flow of cooled coolant from said first axial path of flow in said second passage into a pair of second axial paths of flow in opposition to said first path of flow for return to the reactor; and
  a heat absorbing medium conveying means axially disposed in said second passage between said shell and said cylinder for cooling the flow of heated coolant in said first path of flow.

9. An apparatus as set forth in claim 8 which further includes a plurality of longitudinally spaced sets of radial arms connecting said cylinder to said shell, said radial arms supporting said conveying means thereon, at least one of said sets of radial arms including hollowed arms communicating said first passage with said third passage for passing the coolant therethrough.

10. An apparatus as set forth in claim 8 wherein said shell has a plurality of apertures at the base thereof for communicating said first passage with said second passage.

11. An apparatus as set forth in claim 8 wherein means is provided for directing said flow of cooled coolant from said second passage into said other passages.

12. An apparatus as set forth in claim 5 wherein said means is a circulation blower.

References Cited
UNITED STATES PATENTS 3,302,620   2/1967   Menzel _____ 165—15
3,308,878   3/1967   Durst et al. _____ 122—32

CHARLES J. MYHRE, *Primary Examiner.*